United States Patent [19]

Radesky et al.

[11] Patent Number: 4,856,225
[45] Date of Patent: Aug. 15, 1989

[54] GOPHER TRAP

[75] Inventors: Joseph A. Radesky; Carl B. Brandt, both of Lititz, Pa.; Gerald A. Thomas, Elkins, W. Va.; William E. Aksins, Lititz, Pa.

[73] Assignee: Woodstream Corporation, Lititz, Pa.

[21] Appl. No.: 234,079

[22] Filed: Aug. 19, 1988

[51] Int. Cl.[4] ............................................. A01K 23/26
[52] U.S. Cl. ........................................ 43/81; 43/67; 43/70; 43/92; 43/95
[58] Field of Search ............... 43/67, 70, 71, 72, 80, 43/83, 85, 88, 81, 87, 92, 93, 94, 95, 97, 89, 91

[56] References Cited

U.S. PATENT DOCUMENTS

| 1,457,670 | 6/1923 | Pietrok | 43/91 |
| 1,481,222 | 1/1924 | Odatey |  |
| 1,485,746 | 2/1924 | Ward | 43/91 |
| 1,972,641 | 9/1934 | Barrett |  |
| 2,196,862 | 4/1940 | Graybill | 43/91 |
| 2,575,435 | 11/1951 | Wilken | 43/88 |
| 2,598,974 | 6/1952 | Conrad |  |
| 4,109,407 | 8/1978 | Johnson | 43/91 |

Primary Examiner—Nicholas P. Godici
Assistant Examiner—Michael William Starkweather
Attorney, Agent, or Firm—Fleit, Jacobson, Cohn, Price, Holman & Stern

[57] ABSTRACT

A gopher trap has a wire base frame with elongate limbs connected by a cross member at a distal end of the trap. Wire jaws are pivotly mounted on the respective limbs adjacent the distal end. The limbs are connected at the proximal end of the trap by a transverse pin which carries a pivotal jaw actuator plate and a pivotal trigger pan. The trigger pan is attached to an elongate trigger rod which extends under the length of the actuator plate to the distal end of the trap. The actuator plate embraces the respective jaws for opening and closing same and is spring urged away from the base frame to bias the jaws into closed position. The trap may be set by depressing the actuator plate and allowing the trigger pan to pivot forwardly so that the distal end of the trigger rod can engage under the cross member at the distal end of the base frame. The trap is sprung when a rodent pushes the trigger pan rearwardly and disengages the trigger rod from under the cross member.

9 Claims, 1 Drawing Sheet

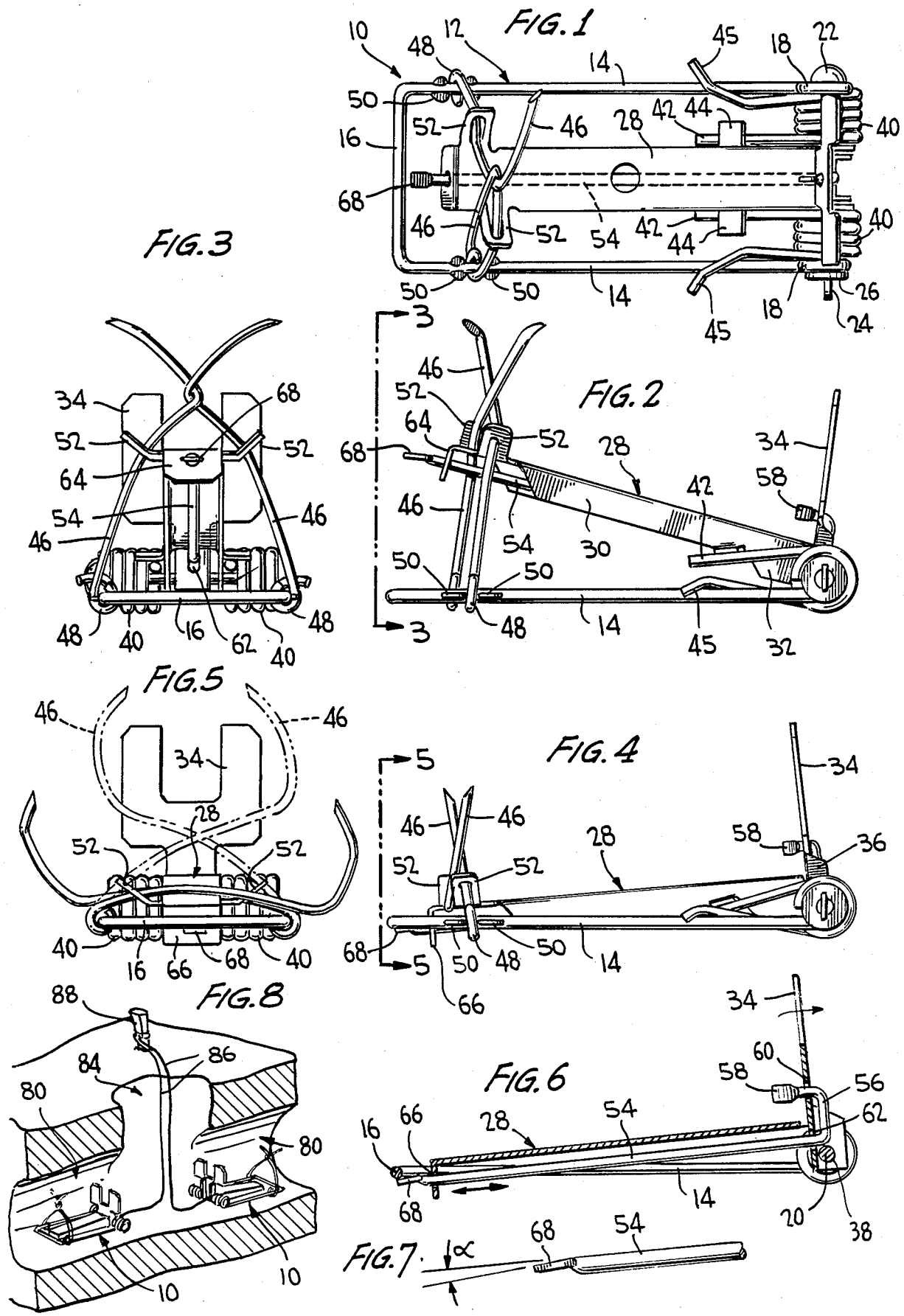

GOPHER TRAP

BACKGROUND OF THE INVENTION

This invention relates to rodent traps, particularly gopher traps.

Traps designed specifically for destroying gophers within their burrows are well known and numerous designs of such traps have been proposed in the past. Generally, such traps are placed within the gopher burrow or tunnel near its exit so that as a gopher pushes dirt along the burrow toward the exit in an effort to close the opening, the gopher must, of necessity, cross the trap and spring same. Commonly, such traps have some form of spring loaded strangulation and/or impaling mechanism. The present invention is concerned with traps of this general kind.

SUMMARY OF THE INVENTION

It is an object of the invention to provide a rodent trap of the type discussed above which is relatively simple and economical to manufacture, which is simple and safe to set by an operator and place in a gopher burrow or tunnel yet which will effectively catch and destroy a gopher.

A rodent trap in accordance with the invention has a pair of opposed generally hook-shaped wire jaws with spiked ends which are pivotly mounted on opposite limbs of a yoke-like stiff wire base member. The jaws are carried adjacent one end of the base member and at the other end there is pivotally mounted a sprung elongate arm which extends lengthwise of the base between its respective limbs. The arm is forcibly urged upwardly away from the base by means of coil springs or the like and has transverse tabs adjacent its distal end which engage around the respective jaws. At the pivot end of the arm, there is carried an upstanding pan and an elongate trigger attached to the pan extends under the length of the arm. The arm, the pan, and the spring are all pivotally carried on a spring pin which extends transversely across the limbs of the base at the proximal end of the trap.

The design of the pan and the trigger is such that the trap can be set simply by depressing the arm against the spring action to bring the arm into substantial parallelism with the base and tilting the trap forwardly whereby the pan pivots slightly about the hinge pin moving the trigger lengthwise to a position in which its distal end can be engaged under the cross bar of the yoke-like base. In this position, the trap is set and the jaws are opened out. When a gopher pushes dirt lengthwise across the trap from the distal end to the proximal end, the dirt will engage against the pan pushing this backwards, thereby disengaging the distal end of the trigger from under the cross bar of the base and springing the trap. The transverse jaw-engaging tabs on the arm force the jaws toward one another when the arm is urged upwardly thereby surrounding the gopher and causing the spiked ends of the jaws to penetrate the gopher's abdomen thereby destroying same.

In order to provide an effective trigger setting and trigger releasing function when the trap is sprung, the distal end portion of the trigger should preferably be angled somewhat downwardly with respect to the length of the trigger, for example, at an angle of about 5 degrees. Also, this end of the trigger may be somewhat flattened.

Additional features of the invention reside in the manner of attachment of the jaws to the base, the jaws preferably being looped around the base and held in place by flats which are coined on the limbs of the base and allow the jaws to pivot thereon while precluding lengthwise movements. This structure lends itself to speedy and economical manufacture.

The flat and angle on the end of the trigger allows the trigger pressure to be reduced to a level at which the trap will readily be sprung by the pressure exerted on the pan by the gopher. The jaws themselves have a size and configuration sufficient to provide enough width for a gopher to cross over when the trap is set and placed in a gopher burrow yet still reach high enough to grab the animal and hold and kill same.

Additional features and advantages of the invention will become apparent from the ensuing description and claims read in conjunction with the attached drawings.

BRIEF DESCRIPTION OF THE DRAWINGS

FIG. 1 is a plan view of a gopher trap in accordance with the invention, the trap being shown in a sprung condition.

FIG. 2 is a side elevational view of the trap in the FIG. 1 configuration.

FIG. 3 is an end elevational view on line 3—3 of FIG. 2.

FIG. 4 is a view similar to FIG. 2 showing the trap in a set configuration.

FIG. 5 is an end elevational view on line 5—5 of FIG. 4.

FIG. 6 is a sectional elevational view of the trap shown in the FIG. 4 configuration and with the jaws omitted.

FIG. 7 is an enlarged detailed view of a distal end portion of the trap trigger.

FIG. 8 is a semi-diagrammatic broken away perspective view showing the manner of use of a pair of traps according to the invention.

DESCRIPTION OF THE PREFERRED EMBODIMENT

The illustrated trap 10 has a yoke-like base frame 12 with opposite elongate limbs 14 and a cross bar 16 at one end, the distal end, of the trap. At the other end of the trap, each limb is bent to form an eye 18. A spring pin 20 (FIG. 6) extends through the eyes and is held in place by a pin head 22 at one end and a flat 24 at the other end. A washer 26 is interposed between the flat 24 and the respective limb 14 of the base.

On pin 20, between the limbs 14, there is mounted an elongate pivotal actuator plate 28, the plate having downwardly bent flanges 30 with enlarged portions 32 at the proximal end of the plate with openings (not shown) whereby the plate is pivotly mounted on pin 20. A generally U-shaped flat pan 34 is also pivotly mounted on pin 20 between the flanges 32, the proximal end of the plate being cut away to accommodate the pan and the pan itself having rearwardly bent flanges 36 with respective openings 38 (FIG. 6) whereby the pan is pivotly mounted on pin 20.

Additionally, surrounding pin 20 on opposite sides of plate 28 are respective coil springs 40. The coil springs each have an inner arm 42 which engages under a projection 44 bent outwardly from a respective flange 30 of plate 28 and an outer arm 46 which engages over a respective limb 14 of the base frame. The effect of the springs 40 is to forcibly urge the plate 28 upwardly away from base 12 toward the position shown in FIGS. 2 and 3.

Adjacent the distal end of the base frame 12 are a pair of hook-shaped wire trap jaws 46 which have eyes 48 at their lower ends whereby the jaws are mounted around the respective limbs 14 of the base. The limbs have flats 50 coined thereon straddling the eyes 48 to hold the jaws in lengthwise position on the respective limbs while allowing pivotal movements of the jaws. As most evident in FIGS. 1 and 3, the jaws 46 are shaped to loop around each other and their free upper or outer ends are sharply spiked. Further, plate 28 adjacent its distal end has transverse tabs 52 with openings through which the respective jaws 46 extend. The effect of the assembly comprising plate 28, springs 44, and jaws 46 is that when the plate is depressed toward the base 12 as shown in FIGS. 4 and 5, the jaws will be opened out into the full line position shown in FIG. 5, but when the plate 28 is allowed to spring upwardly to the position shown in FIGS. 2 and 3, tabs 52 will force the jaws to close on one another through the position shown in dotted line in FIG. 5 and into the closed position shown in FIG. 3.

The trap further includes an elongate wire trigger member 54 which is bent substantially into a U, 56, at the proximal end of the trap with one end 58 of the trigger being extended through an opening 60 in pan 34 and flattened to prevent its withdrawal, the trigger extending around the back of pan 34 through a further opening 62 in the pan and under the length of plate 28. At its distal end, plate 28 has a downwardly turned flange 64 with an opening 66 through which the trigger extends and, as most clearly seen in FIG. 7, the distal end portion 68 of the trigger is bent downwardly at an angle alpha to the main body of the trigger and is flattened. Preferably, angle alpha may be about 5 degrees.

The trap may be very easily set (from the sprung position shown in FIGS. 1 to 3), by gripping the limbs 14 in the fingers of the opposite hand with the operator's thumbs resting on top of plate 28. Thumb pressure is then used to depress the plate 28 into the position shown in FIGS. 4 and 6. Then, simply by tilting the trap forwardly towards its distal end, the pan 34 will tilt forwardly under gravity thereby extending the trigger 54 lengthwise toward the distal end so that the forward end portion 68 engages under cross-bar 16. The trap is then set and plate 28 can be released.

As an alternative to tilting the trap forwardly during setting in order to engage end 68 of the trigger under cross-bar 16, the operator can move the trigger forwardly with the small fingers while depressing plate 28.

In use, conveniently, a pair of traps 10 are placed at the ends of respective tunnels 80 of a gopher burrow adjacent the vertical shaft 84. Cords 86 may be used to secure the traps to an above-ground stake 88. As indicated, the proximal ends of each trap are located nearest shaft 84. When a gopher moves along either tunnel 80 towards the shaft 84 while pushing dirt towards the shaft in an effort to close the opening, the gopher must of necessity, cross the length of the respective trap 10. In so doing, the dirt being pushed ahead of the gopher engages pan 34, tilting it rearwardly and thereby disengaging the forward end 68 of trigger 54 from under cross-bar 16. Release of the trigger causes the trap to be sprung so that the jaws 46 close around the gopher's body and their spiked ends penetrate the abdomen to destroy the gopher. The flattened nature of end portion 68 of the trigger and its downwardly tilted angle alpha facilitates springing of the trap at minimal trigger pressure to ensure that it will be fired with minimum pressure exerted by a gopher against the pan 34.

While only a preferred embodiment of the invention has been described herein in detail, the invention is not limited thereby and modifications can be made within the scope of the attached claims.

What is claimed is:

1. A rodent trap comprising an elongate base frame having a proximal end and a distal end with a cross member at the distal end, jaw means mounted on the base frame for movement from an open position when the trap is set to a closed position when the trap is sprung, jaw actuator means mounted on the base frame for moving the jaw means between said positions, spring means connected between the base frame and the actuator means forcibly urging the actuator means to retain the jaw means in the closed position, settable trigger means associated with the actuator means for engaging a part of the base frame when set and holding the actuator means in a condition retaining the jaw means in the open position in opposition to the spring means, and trigger release means for disengaging the trigger from said part of the base frame thereby springing the trap, the release means comprising a trigger pan pivotly mounted about a transverse axis at the proximal end of the base frame, the trigger means comprising a trigger rod attached to the pan and extending lengthwise of the trap, the trigger rod having distal end portion for engaging under said cross member to set the trap by forward tilting of the pan and for being disengaged from under said cross member to spring the trap when the pan is tilted rearwardly by a rodent.

2. The invention as defined in claim 1 wherein the distal end portion of the trigger rod has a flat upper surface which is angled downwardly from the rod.

3. The invention as defined in claim 2 wherein said surface is angled downwardly at about 5 degrees.

4. The invention as defined in claim 1 wherein the actuator means comprises an elongate actuator plate extending lengthwise with respect to the base frame, the plate having a proximal end pivotly mounted on the base frame coaxially with the trigger pan, and wherein the trigger rod extends lengthwise under the plate with the distal end portion of the rod projecting at a distal end of the plate.

5. The invention as defined in claim 4 wherein the plate has a down-turned flange at its distal end and the trigger rod extends through an opening in the flange.

6. The invention as defined in claim 4 wherein the trigger rod has a U-shaped proximal end portion with a base located behind the trigger pan and limbs extending through respective openings in the trigger pan.

7. The invention as defined in claim 4 wherein the base frame has elongate limbs separated by the cross member and extending lengthwise of the base frame, wherein the jaw means includes a separate jaw pivotly mounted on each limb, and wherein the actuator plate has portions which embrace the respective jaws for moving same between the open and closed positions.

8. The invention as defined in claim 7 wherein each jaw has an eye at one end pivotally mounting same on the respective limb and wherein the limb has coined flats embracing the eye and preventing the jaw from moving lengthwise along the limb.

9. The invention as defined in claim 7 wherein the respective jaws are looped around each other and have spiked ends for piercing a rodent's abdomen.

* * * * *